United States Patent [19]

Fujiwara et al.

[11] 4,011,147

[45] Mar. 8, 1977

[54] METHOD FOR DIAPHRAGM ELECTROLYSIS OF ALKALI METAL HALIDES

[75] Inventors: Hiroshi Fujiwara; Koichi Asano; Asao Takahashi; Akio Sugishita, all of Saitama, Japan

[73] Assignee: Maruzen Oil Co. Ltd., Osaka, Japan

[22] Filed: Sept. 23, 1975

[21] Appl. No.: 616,114

Related U.S. Application Data

[63] Continuation-in-part of Ser. No. 540,467, Jan. 13, 1975, abandoned.

[30] Foreign Application Priority Data

Jan. 11, 1974 Japan .............................. 49-6375

[52] U.S. Cl. .............................. 204/98; 204/128; 204/296; 204/159.11; 204/158 HE
[51] Int. Cl.² ..................... C25B 1/16; C25B 1/26; C25B 13/08
[58] Field of Search ..................... 204/98, 128, 296

[56] References Cited

UNITED STATES PATENTS

| 2,967,807 | 1/1961 | Osborne et al. | 204/296 |
| 3,304,272 | 2/1967 | Zenftman | 204/296 |

*Primary Examiner*—R. L. Andrews
*Attorney, Agent, or Firm*—Sughrue, Rothwell, Mion, Zinn & Macpeak

[57] ABSTRACT

A method for diaphragm electrolysis of an alkali metal halide which comprises electrolyzing an alkali metal halide solution by passing an electric current through an anode compartment and a cathode compartment of an electrolytic cell containing the alkali metal halide solution with an ion-exchange membrane of a graft copolymer of a polyolefin main chain and a side chain composed mainly of hydroxystyrene and grafted to the polyolefin main chain separating the anode compartment and the cathode compartment.

23 Claims, No Drawings

METHOD FOR DIAPHRAGM ELECTROLYSIS OF ALKALI METAL HALIDES

CROSS-REFERENCE TO RELATED APPLICATIONS

This application is a continuation-in-part application of copending application, Ser. No. 540,467, filed Jan. 13, 1975, now abandoned.

BACKGROUND OF THE INVENTION

1. Field of the Invention

This ivention relates to a method for electrolyzing halides of monovalent alkali metals using an electrolytic diaphragm, and more specifically, to a method for electrolyzing halides of monovalent alkali metals using a cation exchange membrane composed of a graft copolymer of a polyolefin main chain to which a side chain composed mainly of hydroxystyrene is grafted.

2. Description of the Prior Art

In the method of electrolyzing an aqueous solution of an alkali metal halide in an electrolytic cell including an anode, a cathode, a diaphragm disposed between them for separating the electrolytic cell into an anode compartment and a cathode compartment, and means provided outside of the cell for passing an electric current between the anode and the cathode, the feeding of the aqueous solution of the alkali metal halide into the anode compartment and the subsequent passing of a current between both electrodes result in the conversion of the halogen ion to the halogen at the anode. The alkali metal ion moves to the cathode compartment via the diaphragm, and an alkali metal hydroxide and hydrogen gas are generated at the cathode. Previously, a porous diaphragm made of asbestos has frequently been used for this purpose. However, since an asbestos porous diaphragm does not possess selective permeability between positive and negative ions and between monovalent and polyvalent ions, a part of the hydroxide ion formed in the cathode compartment diffuses into the anode compartment through the diaphragm to cause a reduction in current efficiency. At the same time, very small amounts of divalent or higher cations such as iron, magnesium or calcium contained as impurities also move to the cathode compartment together with the alkali metal ion, and thus cannot be removed. Thus, in order to prevent diffusion of hydroxide ions into the anode compartment, a technique is employed of flowing a part of the anodic solution into the cathode compartment through the diaphragm. However, an enormous cost in the subsequent concentrating and purifying steps is required because the aqueous solution of the alkali metal hydroxide obtained in the cathode compartment contains a large quantity of the alkali metal halide and traces of polyvalent metal ions, and the concentration of the resulting alkali metal hydroxide cannot be increased.

It is known that the use of a cationic exchange membrane as the diaphragm obviates the above defect. If a cation exchange membrane having an ideal selective permeability to monovalent cations is used as a diaphragm, alkali metal hydroxides in high concentrations can be obtained from the cathode compartment without involving the above difficulties because the cation exchange membrane does not permit the permeation of hydroxide ions, halogen ions and polyvalent metal ions such as iron or magnesium. However, it is very difficult in practice to produce membranes having an ideal permselectivity to monovalent cations. Conventional cation exchange membranes have proved to be not entirely feasible for one or more reasons. For example, these membranes cannot ensure sufficient current efficiency or sufficient purity or concentration of the product. Moreover, since the membranes are exposed to severe conditions, they do not have sufficient endurance for use for prolonged periods of time.

SUMMARY OF THE INVENTION

An object of this invention to provide a method for electrolyzing alkali metal halides using a diaphragm having excellent performance.

Another object of this invention is to provide an electrolytic diaphragm having high permselectivity to monovalent cations, mechanical strength and durability.

The present invention provides a method for electrolyzing alkali metal halides using a cation exchange membrane as a diaphragm, the cation exchange membrane being composed of a graft copolymer of a polyolefin main chain to which a side chain composed mainly of hydroxystyrene is grafted.

More specifically the present invention provides a method for diaphragm electrolysis of an alkali metal halide which comprises electrolyzing an alkali metal halide solution by passing an electric current through an anode compartment and a cathode compartment of an electrolytic cell containing the alkali metal halide solution with an ion-exchange membrane of a graft copolymer of a polyolefin main chain and a side chain composed mainly of hydroxystyrene and grafted to the polyolefin main chain separating the anode compartment and the cathode compartment.

DETAILED DESCRIPTION OF THE INVENTION

The graft copolymer used in this invention can be crosslinked or sulfonated, or both cross-linked and sulfonated.

The diaphragm used in this invention can be produced, for example, by the following method.

The polyolefin used in this invention can be aliphatic hydrocarbon polymers, especially those polymers of monomer units having 2 to 10 carbon atoms, such as polyethylene, polypropylene, poly-1-butene, poly-1-pentene, poly-1-nonene, poly-1-decene, poly-3-cyclopentyl-1-propene, poly-3-cyclohexyl-1-propene, poly-3-methyl-1-butene, poly-3-cyclohexyl-1-butene, poly-3-phenyl-1-butene, poly-3-methyl-1-pentene, poly-3-methyl-1-hexene, poly-4,4-dimethyl-1-hexene, poly-5-methyl-1-heptene, etc.; aromatic hydrocarbon polymers, especially polymers of compounds represented by the general formula (I)

wherein $R_1$, $R_2$ and $R_3$ each represents a hydrogen atom or an alkyl group having 1 to 10 carbon atoms, and A is an aryl group (a) having the formula

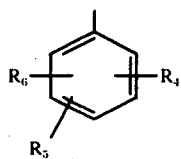

or (b) having the formula

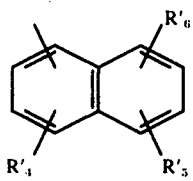

in which $R_4$, $R_5$, $R_6$, $R'_4$, $R'_5$ and $R'_6$ each represents a hydrogen atom or an alkyl group having 1 to 10 carbon atoms, such as polystyrene, poly(α-methylstyrene), poly(tert-butylstyrene), poly(p-methylstyrene), poly(2,4-dimethylstyrene), poly(2,5-dimethylstyrene), poly(m-ethylstyrene), poly(p-ethylstyrene), poly(p-isopropylstyrene), poly(p-hexylstyrene), poly(p-octylstyrene), poly(p-decylstyrene), poly(p-methyl-α-methylstyrene)

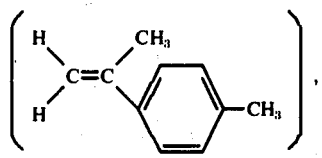

poly(α-vinylnaphthalene), poly(β-vinylnaphthalene), poly(α-isopropenylnaphthalene), poly(α-vinyl-4-methylnaphthalene), poly(1-vinyl-5-ethylnaphthalene), poly(1-vinyl-5,8-dimethylnaphthalene), etc.; alicyclic hydrocarbon polymers, especially polymers of a monomer represented by the general formula (II)

$$R_7HC = CHR_8 \quad (II)$$

in which $R_7$ and $R_8$ each represents a hydrogen atom, an alkyl group having 1 to 10 carbon atoms or a cycloalkyl group having 3 to 10 carbon atoms, and at least one or $R_7$ and $R_8$ is a cycloalkyl group such as a cyclopropyl group, a cyclopentyl group, a cyclohexyl group, a bicyclo[2,2,1]heptyl group, such as polyvinyl cyclohexane, poly(4-methyl-1-vinyl-cyclohexane)

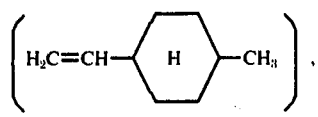

poly (3-methyl-1-vinyl-cyclohexane)

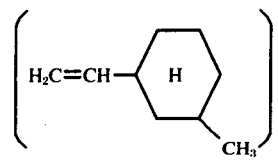

poly(1-cyclohexyl-propene-1)

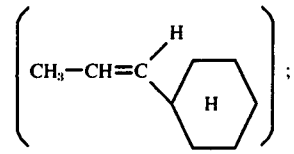

or copolymers derived from two or more aliphatic, alicyclic or aromatic monomers that constitute the above previously described polymers. The polyolefin that makes up the main chain of the graft copolymer can have branched chains.

The range of the degree of polymerization of these polymers is such that the polymers are solid at normal temperatures (e.g., 20° to 30° C). The polymers can be used in various desired forms such as powders, granules, fibers or films. If a polymer in a film form is used, the product can be used directly as a diaphragm.

The hydroxystyrene that constitutes the hydroxystyrene side chain of the graft copolymer can be a para-, meta- or ortho-isomer, or a mixture of these isomers. A suitable proportion of the hydroxystyrene side chain is about 5 to 500% by weight, preferably 20 to 200% by weight, based on the polyolefin main chain. Instead of hydroxystyrene, an acyloxystyrene can be grafted to the polyolefin main chain with subsequent hydrolysis of the acyloxy group. Examples of suitable acyloxystyrenes are those having the formula

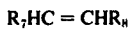

wherein R' represents a hydrocarbon group having 1 to 20 carbon atoms such as a straight or branched chain alkyl group, or a $(CH_2)_nP$ group wherein P is a cycloalkyl group, an alkyl (or phenyl)-substituted-cycloalkyl group, an aryl group or an alkylsubstituted aryl group and n is 0 or an integer such that the total number of carbon atoms in the $(CH_2)_nP$ group is not more than 20. Suitable examples of the -OCOR' group which can be substituted on the styrene moiety are acetoxy, propionyloxy, butyryloxy, valeryloxy, caproyloxy, stearyloxy, isobutyryloxy, trimethylacetoxy groups and the like; cyclopentanecarboxy, cyclohexanecarboxy, cyclooctanecarboxy, 1-methylcyclohexanecarboxy, 2,2-dimethylcyclohexanecarboxy, 1-isopropylcyclohexanecarboxy, 1-phenylcyclohexanecarboxy, cyclohexylacetoxy, ω-cyclohexylpropionyloxy; benzoyloxy, phenylacetoxy, 2-methylphenylacetoxy, 2,3-dimethylbenzoyloxy, toluoyloxy, p-ethylbenzoyloxy, p-isopropylbenzoyloxy and the like. Most generally, para-acetoxystyrene is used. In order to reduce the water content of the graft copolymer containing the hydroxystyrene side chain and to increase the current efficiency thereof, the graft copolymer can, if desired, be cross-linked using a difunctional compound reactive with phenolic hydroxyl groups, a polyene compound having at least 2 polymerizable double bonds in the molecule, or an organic sulfonic acid compound.

Examples of suitable difunctional compounds are diepoxides, for example, aliphatic, aromatic and alicyclic diepoxides, such as ethylene glycol diglycidyl ether, diethylene glycol diglycidyl ether, bisphenol A diglycidyl ether, cyclohexane diol diglycidyl ether, and epoxy resins; diisocyanates such as hexamethylene diisocyanate, tolylene diisocyanate, xylylene diisocyanate,dipheylmethane-4,4'-diisocyanate, or hexahydrotolylenediisocyanate; and acid dihalides such as adipoyl dichloride, terephthaloyl dichloride and hexahydroterephthaloyl dichloride. A suitable amount of the difunctional compound is about 0.01 to 0.5 equivalent per equivalent of the phenolic hydroxyl group.

Examples of suitable organic sulfonic acid compounds are aliphatic or aromatic sulfonic acids having 1 to 20 carbon atoms or their alkyl esters, e.g., in which the alkyl moiety has 1 to 20 carbon atoms. Examples of aliphatic sulfonic acids which can be used are methane sulfonic acid, ethane sulfonic acid, propane sulfonic acid and the like. Examples of aromatic sulfonic acids which can be used are benzene sulfonic acid, p-toluene sulfonic acid, m-xylene-4-sulfonic acid, $\beta$-naphthalene sulfonic acid and the like.

When the graft copolymer is cross linked with an organic sulfonic acid compound, the graft copolymer is immersed in a solution of the organic sulfonic acid compound, e.g., in water, methanol, ethanol, diethyl ether, tetrahydrofuran, acetone, methyl ethyl ketone and the like, and reacted by heating, or the copolymer is impregnated with this solution and reacted by heating. A suitable concentration of the organic sulfonic acid in the solution ranges from about 0.1 to 20% by weight. A suitable reaction temperature is generally about 100° to 150° C. The reaction time differs according to the end use of the copolymer, or the degree of crosslinking, but generally, a suitable reaction time is about 5 minutes to 5 hours or longer.

The polyene compound having at least two polymerizable double bonds in the molecule can, for example, be an aliphatic compound such as butadiene, isoprene, 1,4-pentadiene, 1,4-hexadiene, 1,5-hexadiene, 1,2-divinyl-cyclobutane, 1,7-octadiene, 1,6-heptadiene, 1,3-pentadiene, dimethylbutadiene, 3-methyl-1,3-butadiene, etc., an alicyclic compound containing double bonds in the ring or in a substituent such as 1-alkyl-1-cyclopentene, cyclopentadiene, 1-allyl-1-cyclohexene, cyclohexadiene, 4-vinyl-cyclohexene, ethylidene norbornene, etc., and an aromatic compound containing unsaturated substituents such as divinylbenzene (o-, m-, p-isomers or mixture thereof), diallylbenzene (o-, m-, p- isomers or mixture thereof), etc. Suitable aliphatic compounds are aliphatic hydrocarbons, and aliphatic esters, such as diesters formed between unsaturated carboxylic acids such as acrylic acid, methacrylic acid, crotonic acid, angelic acid, tiglic acid, vinylacetic acid, allylacetic acid, diallylacetic acid, oleic acid, linolenic acid, linoleic acid, etc., and dihydric alcohols such as ethylene glycol, propylene glycol, butane-2,3-diol, propane-1,3-diol, butane-1,3-diol, butane-1,4-diol, etc., diesters formed between dicarboxylic acids such as oxalic acid, malonic acid, succinic acid, glutaric acid, adipic acid, pimelic acid, etc., and unsaturated alcohols such as methallyl alcohol, crotyl alcohol, methylvinylcarbinol, allylcarbinol, 4-pentenol, cis-3-hexen-1-ol, etc., diesters formed between the above described unsaturated carboxylic acids and the above described unsaturated alcohols, diesters formed between the above described unsaturated carboxylic acids and the above described unsaturated diols, and diesters formed between the above described unsaturated dicarboxylic acids and the above described unsaturated alcohols, and the like. These compounds have 4 to 20 carbon atoms. Preferred examples of the polyene compounds are divinylbenzenes (o-, m- or p-isomers, or mixtures of these isomers), isoprene, butadiene, cyclopentadiene, ethylidene norbornene, diol esters of acrylic acid or methacrylic acid, or divinyl esters of adipic acid. Of these compounds, divinylbenzenes and isoprene are particularly preferably used. All of the o-, m- and p-isomers of divinylbenzene can be used in this invention. Generally, a mixture of these isomers is used. Generally commercially available divinylbenzene sometimes contains about 45% by weight of ethylvinylbenzene, but this mixture can be used as such in the present invention.

A membrane composed of a graft copolymer of a polyolefin as a main chain and a side chain composed of hydroxystyrene and the polyene compound grafted to the main chain, in which the polyolefin is crosslinked by the polyene compound of the side chain, can also be used as the diaphragm in accordance with this invention. In this copolymer, too, the above-described various polyolefins and polyene compounds, and hydroxystyrene can be used as constituents of the copolymer. Irrespective of the method of introducing the polyene compound, the amount of the hydroxystyrene and polyene compound is preferably about 5 to 500% by weight based on the polyolefin main chain. If the amount is less than about 5%, the resulting copolymer has insufficient properties as an electrolytic diaphragm. On the other hand, if the amount is larger than about 500% by weight, the resulting graft copolymer has insufficient strength and softness, and becomes difficult to use.

The grafting ratio, or the rate of introduction (based on the polyolefin), of the polyene compound is generally about 0.5 to 100%. If the grafting ratio is less than about 0.5%, the degree of crosslinking is low, and no outstanding effect is obtained by incorporating the polyene compound. On the other hand, if the grafting ratio is more than about 100%, cross-linking becomes excessive, and the polymer generally tends to be hard, brittle and tearable, and tends to have a high electric resistance that makes the passage of electricity through the polymer difficult. In view of the ion transport number, electric resistance and strength of the membrane, an especially preferred grafting ratio is about 20 to 200% for hydroxystyrene, and about 2 to 50% for the polyene compound.

Preferably, the hydroxystyrene: polyene weight ratio is about 200:1 to 1:1, especially 50:1 to 2:1.

Furthermore, an ion-exchange membrane of a sulfonated product of the graft copolymer, either crosslinked or uncrosslinked, can also be used as a diaphragm in this invention. In these graft copolymers, sulfonic acid groups are introduced mainly into the hydroxystyrene portion, but can be introduced into the polyene compound portion grafted for crosslinking purposes.

The rate of introduction of sulfonic acid groups is not particularly limited, but generally, about 0.5 to 2 sulfonic acid groups can be introduced per unit of hydroxystyrene. A suitable thickness of the membrane composed of the graft copolymer or the sulfonated product thereof is about 0.05 to 0.5 mm (in a wet condition).

The membrane composed of the above graft copolymer or its sulfonated product can be those prepared by any desired method. For example, a membrane composed of the graft copolymer containing a hydroxystyrene side chain can be prepared by subjecting a polyolefin film to ionizing radiation in vacuo, in air or in an inert gas such as nitrogen, and then immersed in a solution of a hydroxystyrene monomer or an acyloxystyrene monomer or a mixture of these (when the acyloxystyrene monomer is used, the grafted acyloxystyrene is hydrolyzed to convert the acyloxystyrene to hydroxystyrene). The membrane can also be obtained by immersing the polyolefin film in a solution of the styrene monomer, and applying ionizing radiation (when an acyloxystyrene monomer is used, hydrolysis is carried out subsequently as described above). Alternatively, a powdery or granular polyolefin is used in the above process instead of the film-form polyolefin to obtain a powdery or granular graft copolymer, and such a copolymer can be fabricated into film form using any desired film-forming techniques such as press-forming or melt-extrusion. If desired, the grafted copolymer obtained in a film form is subjected to the above-described crosslinking treatment. The production of the graft copolymer and its sulfonated product is described in detail in U.S. Patent Application Ser. No. 540,789, filed Jan. 13, 1975 (corresponding to Japanese Patent Application No. 6373/74 and 6374/74).

The crosslinking treatment using the polyene compound can be performed easily by utilizing ionizing radiation as in the case of the graft copolymerization.

In order to obtain a graft copolymer in which a side chain composed of hydroxystyrene and the polyene compound is grafted to a polyolefin main chain and which is crosslinked with the polyene compound of the side chain, a solution containing both the styrene monomer and the polyene compound monomer is used in the above-described method for graft copolymerization using ionizing radiation, whereby the styrene and polyene compounds are both grafted to the polyolefin, and crosslinking occurs by the polyene compound so grafted.

The styrene compound and the polyene compound are used for the graft copolymerization reaction as solutions in organic solvents which uniformly dissolve the sytrene compound and the polyene compound, but dot not dissolve the polyolefin. Examples of suitable organic solvents are ketones such as acetone or methyl ethyl ketone, esters such as ethyl acetate or butyl acetate, alcohols such as methyl alcohol, ethyl alcohol, propyl alcohol or butyl alcohol, ethers such as tetrahydrofuran, aromatic hydrocarbons such as benzene or toluene, aliphatic or alicyclic hydrocarbons such as n-heptane or cyclohexane, or a mixture thereof. Because these aliphatic or alicyclic hydrocarbons have high affinity for the hydrocarbon polymers, they swell the polymers and permit easy introduction of the monomer. Thus, the grafting reaction is accelerated, and the grafting becomes uniform. The amount of these hydrocarbons should be such that they do not dissolve the polymer at the reaction temperatures, and is determined according to the type of the polymer.

The concentration of the monomer in the reaction solution is not critical, but generally, a suitable concentration of the monomer is about 0.1 to 80% by weight, preferably 5 to 50% by weight, based on the solution.

When the monomeric mixture to be grafted contains an unsaturated compound such as ethyl vinylbenzene, for example, such an unsaturated cmpound is also graft copolymerized and contained in the side chain. The presence of unsaturated compounds other than acyloxystyrenes, hydroxystyrene and polyene compounds, especially monounsaturated compounds other than those having a polymerization inhibiting action, for example, styrene, 1-hexene and acrylic acid esters in addition to ethyl vinylbenzene, does not adversely affect the reaction. However, if the amount of such an unsaturated compound is too large, the effect of the present invention is reduced. For practical purposes, therefore, the amount of such a compound can be about 30% by weight or less based on the total monomeric mixture.

The source of ionizing radiation can be $\gamma$-rays, X-rays, electron beams, $\alpha$-rays, or mixtures of these. A suitable intensity, that is, dose, of the ionizing radiation is about $10^3$ to $10^{11}$ rads per hour. With electron beams, doses of as high as $10^9$ to $10^{11}$ rads per hour can be used. Although lower doses can be used, a long time is required to obtain the desired amount of irradiation. Furthermore, higher doses can also be used, but are not feasible because higher doses may result in the structural change of the polyolefin, for example, excessive crosslinking, cleavage of the main chain, and deformation and breakage of the polymer by heat.

The use of electron beams generated from an electron beam accelerator is especially effective since high dose irradiation can be obtained within short periods of time. The total dose of ionizing radiation required for graft copolymerization is usually from about $10^5$ rads to $10^{10}$ rads.

The temperature employed for ionizing radiation must be one at which the polyolefin is not dissolved and deformed. In view of the life of the geneated radicals (which is short at high temperatures), a feasible temperature generally ranges from about $-100°$ C to $40°$ C. There is no particular lower limit to this temperature except that arising due to economical and technical problems.

The graft copolymerization reaction temperature generally ranges from the temperature at which the reaction mixture is a liquid, to about $100°$ C. If the reaction temperature is too low, the time required for the reaction increases, and if the reaction temperature is too high, gellation or homopolymeization under heat tends to occur. A suitable temperature can be selected so that such difficulties do not occur. For practical purposes, temperatures of about $0°$ to $70°$ C are suitable. Where the ionizing radiation is applied in air, the graft copolymerization is preferably carried out at a temperature of about $60°$ C or more because the peroxide generated must be decomposed. Ionizing radiation in advance in air or in a stream of nitrogen is commercially advantageous. Suitable additional atmospheres which can be employed include helium, neon, argon, carbon dioxide, etc.

The resulting graft copolymer, if desired, is washed with an organic solvent, for example, an alcohol such as methanol, ethanol or propanol, a ketone such as acetone or methyl ethyl ketone, or an aromatic hydrocarbon such as benzene or toluene, or mixtures of these. Hydrolysis of graft copolymers containing a side chain comprising the acyloxystyrene, similar to an ordinary hydrolysis of phenol esters, is much easier to perform than the hydrolysis of esters of primary alcohols, and can be carried out easily under mild conditions. Specifically, the graft copolymer is placed in a solution of an acid such as hydrochloric acid, sulfuric acid or an organic sulfonic acid such as ethanesulfonic acid, p-toluenesulfonic acid, benzenesulfonic acid, etc., or a base such as sodium hydroxide or ammonia as a catalyst in water or in a mixture of water and an organic water-soluble solvent (e.g., alcohols such as methanol, ethanol, etc.; ketones such as acetone, methyl ethyl ketone, etc.; and ethers such as tetrahydrofuran, dioxane, etc.), to hydrolyze the acyloxy group of the side chain. Since the hydrolysis is primarily carried out in a heterogenerous system, it is preferably performed in a mixture of water and a water-soluble organic solvent such as an alcohol or ketone in order to increase the affinity between the substrate and the catalyst and also to dissolve the organic acid that is split off in the case of using an acidic catalyst. A suitable hydrolysis temperature is about 50° to 100° C and a suitable amount of the catalyst is about 0.1 to 50% by weight, preferably 1 to 20% by weight, based on the graft copolymer.

In order to obtain membranes composed of a sulfonated product of the graft copolymer, either crosslinked or uncrosslinked, any known method for sulfonating phenols, e.g., as disclosed in *Rodd's Chemistry of Carbon Compounds* 2nd. Ed. Edited by S. Cottey, Vol. III, Part A, p. 374, Elsevier Pub. Co., Inc., 1971, or sulfonating polyvinylpyrrolidone, e.g., as disclosed in D. I. Packam, *J. Chem. Soc.*, 1964, 2617, can be used.

For example, the sulfonation can be effected by sulfonating the graft copolymer with conc. sulfuric acid, sulfuric anhydride, or chlorosulfonic acid, etc. in the presence or absence of a solvent. Examples of suitable solvents which can be used in this process are halogenated hydrocarbons such as chloroform or carbon tetrachloride, polar solvents such as pyridine or dimethylformamide, or solvents such as diethyl ether or dioxane. Catalysts such as silver sulfate can also be used in this process.

When concentrated sulfuric acid is used, the film is immersed in concentrated sulfuric acid, and allowed to react for about 1 hour to about 10 days at about 0° to 40° C. If heating to a temperature of about 60° C is carried out, the treating time can be shortened. If the temperature is too high, the base polymer is attacked with the properties of the polymer being degraded. In order to achieve a mild reaction, up to about 80% by weight of a solvent such as acetic acid or dioxane can be used. When fuming sulfuric acid containing about 5 to 60% by weight of sulfuric anhydride is used, the film is suitably treated at room temperature for about 2 to 10 hours. If the reaction proceeds excessively, the base polymer is also attacked. Where chlorosulfonic acid is used, the graft copolymer is dissolved in a solvent such as chloroform, dioxane, carbon tetrachloride or a mixture of these solvents in a concentration of about 1 to 60% by weight, and reacted at about 0° to 60° C for about 1 hour to 10 days. Then, the reaction product is washed with water. The reaction conditions such as the temperature, the type of reagent, the concetration, or the reaction time are controlled as required so that the proportion of sulfonic acid groups introduced becomes the desired value.

If the graft copolymer is treated with concentrated sulfuric acid at room temperature for about 10 hours, about one sulfonic acid group is introduced per hydroxystyrene unit. When a strong sulfonating agent such as chlorosulfonic acid is used, the treatment of the polymer in a solution of chloroform or dioxane, etc. results in the introduction of about 2 sulfonic acid groups per hydroxystyrene unit, and a membrane having a high ion-exchange capacity can be obtained.

Membranes composed of the above graft copolymers or their sulfonated products have reduced permeability to halogen ions, low electric resistance, high permselectivity to monovalent cations, high mechanical strength and high durability.

In the practice of the method of this invention, any type of electrolytic cell including an anode, a cathode and a cationic exchange membrane as hereinabove decribed and provided between the electrodes can be used. For example, a two-compartment electrolytic cell divided into an anode compartment and a cathode compartment by the cationic exchange membrane, a three-compartment electrolytic cell in which an anode compartment and an intermediate compartment are separated from each other by a non-selective diaphragm and the intermediate compartment and a cathode are partitioned by the above cationic exchange membrane, or a modified three-compartment of four-compartment electrolytic cell built up by providing another non-selective diaphragm in the cathode compartment of the above three-compartment electrolytic cell. The arrangement of the electrodes is also optional. For example, they are arranged perpendicularly, or obliquely in parallel to each other. However, unless there is a special reason to do otherwise, electrodes provided in parallel to each other are generally used. The mode of providing the cationic exchange membrane can also be varied just as in the case of the electrodes, but usually, the membrane is provided perpendicularly. Generally, an iron or iron-type electrode is used as the cathode, and a graphite or dimensionally stable electrode is used as the anode. The scope of this invention, however, is not limited and any appropriate selection of these embodiments can be made.

At the beginning of the electrolysis using the membranes composed of the above graft copolymers or the sulfonated products thereof, the hydrogen atom of the hydroxy group of the hydroxystyrene side chain is inevitably replaced with an alkali metal ion. In the above case, it is preferred to affirmatively replace the hydrogen atom of the hydroxy group of the hydroxystyrene side chain with an alkali metal ion prior to the practice of the electrolysis. The electrolysis does, of course, proceed without any affirmative treatments for replacement of the hydrogen atom by an alkali metal atom. In this case, the voltage employed in the electrolysis often necessarily must be increased or the electrolysis sometimes does not smoothly proceed until the replacement of the hydrogen atom by the alkali metal atom, which inevitably occurs, has taken place. After the replacement has occurred, the electrolysis proceeds smoothly.

As a result of the ability to more easily control the electrolysis after the above-described replacement has occurred prior to use of the membranes, they are preferably contacted with an aqueous solution of an alkali metal hydroxide such as sodium hydroxide, potassium hydroside and lithium hydroxide having a concentration of about 0.1 to 12N, an aqueous solution of an alkali metal hydroxide at the concentration as described above, additionally containing an organic solvent which can be uniformly mixed with the above-described aqueous solution and which is also capable of swelling the membranes, or a solution of an alkali metal hydroxide, at the concentration as described above, dissolved in a lower aliphatic alcohol having 1 to 4 carbon atoms at a temperature of room temperature (e.g., about 20°–30° C) to about 90° C for a period of about 30 minutes to about 5 hours. Suitable examples of an organic solvents which can be employed include methanol, ethanol, dioxane, tetrahydrofuran, acetone, methyl ethyl ketone, etc. Further, suitable examples of lower aliphatic alcohols which can be employed include methanol, ethanol, etc.

When the membranes used are composed of sulfonated products containing sulfonic acid groups, the hydrogen atoms of the sulfonic acid grops similarly are also inevitably replaced by alkali metal ions at the beginning of the electrolysis or in the replacement treatment as set forth previously.

When membranes composed of graft copolymers, such as, for example, a membrane which is produced by grafting side chains composed mainly of an acyloxystyrene on a polyolefin and hydrolyzing the resulting graft copolymer in the presence of an alkali metal hydroxide as a catalyst, are employed, the hydrogen atom of the hydroxy group of the hydroxystyrene side chain thus produced in the membranes is already replaced by an alkali metal ion. Therefore, in such a case, no particular replacement treatment is needed and the use of such copolymers in membranes results in the ability for the electrolysis to proceed smoothly without any affirmative replacement treatment being employed.

An aqueous solution of an alkali metal halide to be electrolyzed such a NaCl, NaBr, NaI, KCl, KBr, KI, LiCl, LiBr, LiI, etc. is fed into the anode compartment or the intermediate compartment, and an electrolytic current is passed between the electrodes whereby an alkali metal hydroxide is formed in the cathode chamber. At the surface of the cathode, hydrogen gas is formed, and at the surface of the anode, halogen is generated.

The alkali metal halides that can be electrolyzed by the method of this invention are halides of monovalent alkali metals. A suitable concentration of the solution electrolyzed generally ranges from about 1% by weight up to a saturated solution. A suitable current density is about 1 to 40 $A/dm^2$.

When sodium chloride is electrolyzed using the cationic exchange membrane in accordance with this invention, the temperature of the electrolytic cell can range from room temperature to about 90° C, and a suitable current density ranges from about 5 to 30 $A/dm^2$. If, for example, sodium hydroxide in a concentraton of 15% by weight is to be produced at a current density of 10 $A/dm^2$ using a cationic exchange membrane having a thickness of 0.15 mm, a current efficiency of 70 to 95% can be obtained, and the resulting sodium hydroxide solution contains sodium chloride in an amount of less than about 0.03% by weight.

The following Examples are given to further illustrate the present invention in detail but the invention is not to be construed as being limited thereby. Unless otherwise indicated, all parts, percents, ratios and the like are by weight.

EXAMPLE 1

An electrolytic cell made of poly(methyl methacrylate) was used which was partitioned by a diaphragm having an effective area of 10 $cm^2$ into an anode compartment having a volume of 7 $cm^3$ and a cathode compartment having a volume of 3.5 $cm^3$ and in which a graphite plate was used as an anode and a stainless steel plate was used as a cathode. A solution feed opening and discharge openings for the solution and gas were provided in each of the anode compartment and the cathode compartment. Brine saturated at room temperature with sodium chloride was fed into the anode compartment at a rate of 15 ml/min., and a prescribed amount of a 0.1N aqueous solution of sodium hydroxide was circulated into the cathode at a rate of 5 ml/min. Both of these solutions were pre-heated by a coil immersed in a constant-temperature water tank, and the temperature inside the cell was maintained at 70° C. Current of a specific density was passed for a prescribed period of time, and then the catholyte was analyzed to examine the concentrations of sodium hydroxide and sodium chloride. On the basis of the concentrations, the curent efficiency was calculated.

Separately, a polyethylene film having a thickness of 0.1 mm was inserted into a glass ampoule, and subsequently, a tetrahydrofuran-n-heptane mixed solution (1:2 by volume) containing 20 wt% of p-acetoxystyrene monomer was added thereto, followed by heat-sealing the glass ampoule in vacuum. After irradiation of $\gamma$-rays of $10^5$ rad/hr at a temperature of 25° C for 10 hours, the resulting film was taken out of the glass ampoule and sufficiently washed with acetone to remove the p-acetoxystyrene homopolymer. The thus treated film was then refluxed in a concentrated hydrochloric acid-methanol mixed solution (1:4 by volume) under heating for a period of 30 minutes, followed by hydrolysis to obtain a film in which a p-hydroxystyrene side chain was grafted at a grafting ratio of 52 wt% (based on the polyethylene). This film was further immersed in concentrated sulfuric acid at a temperature of 25° C for 72 hours and then sulfonated to obtain a cationic exchange membrane. The thus obtained cationic exchange membrane was used as a diaphragm. To the cationic exchange membrane to be used as a diaphragm was subjected a pre-treatment in which the membrane was immersed in a 0.5N sodium hydroxide aqueous solution at a temperature of 80° C for a period of 2 hours prior to the electrolysis. This cationic exchange membrane had a cation transport number of 0.97, an electric resistance, in 0.5N sodium chloride, of 1.7 $\Omega\text{-}cm^2$, and an acidic ion-exchange capacity of 2.2 meq/g. A current of 1.0 A (10 $A/dm^2$) was passed for 5 hours. It was found that the concentration of sodium hydroxide in the catholyte was 16.8& by weight, that the concentration of sodium chloride was 0.02% by weight, and that the current efficiency was 83%.

EXAMPLE 2

A polyethylene film having a thicknes of 0.1 mm was inserted in one leg of an H-type glass cell and a benzene-acetone solution (2:1 by volume) containing 20 wt% of a p-acetoxystyrene monomer was added to the other leg, followed by heat-sealing the H-type glass cell in vacuum. The portion containing the monomer solution was cooled and frozen, followed by covering sufficiently with lead plates. Then the H-type cell was cooled to −30° C and electron beams of 20 Mrad were irradiated onto the polyethylene film using an electron beam accelerator under the conditions, i.e., of an acceleration voltage of 2 MeV, and an acceleration current if 1mA, at this temperature.

After irradiation, the monomer solution was melted and transferred to the film side, and reacted at room temperature (i.e., about 20° to 30° C) for 24 hours. After completion of the reaction, the cell was opened and the resulting film was then taken out, followed by washing thoroughly with acetone. The thus treated film was then hydrolyzed in the same manner as described in Example 1 to obtain a film in which a p-hydroxystyrene side chain was graft-copolymerized at a grafting ratio of 92 wt% (based on the polyethylene).

Electrolysis was then carried out in the same manner as described in Example 1 using the film thus obtained as a diaphragm. It was found that the concentration of sodium hydroxide in the catholyte was 14.2% by weight and the concentration of sodium chloride was 0.01% by weight. The current efficiency was 74%.

EXAMPLE 3

Electrolysis was carried out in the same way as in Example 1 using the same diaphragm as in Example 1 except that it was not sulfonated. It was found that the concentration of sodium hydroxide in the catholyte as 16.9% by weight, that the concentration of sodium chloride was 0.01% by weight, and that the current efficiency was 77%.

EXAMPLE 4

The same graft copolymer film as used in Example 1 except that the film was not sulfonated was immersed in a 10% acetone solution of bisphenol A diglycidyl ether (containing 1% of triethylenetetramine as a curing agent) for 2 hours, and then taken out, followed by air-drying. The resulting film was further heated to 100° C for 30 minutes in an air thermostat to obtain a crosslinked film.

Electrolysis was then carried out in the same manner as described in Example 1 using the resulting crosslinked film as a diaphragm. It was found that the concentration of sodium hydroxide in the catholyte was 16.8% by weight, and that the concentration of sodium chloride was 0.005% by weight. The current efficiency was 85%.

EXAMPLE 5

Electrolysis was carried out in the same way as in Example 1 using a diaphragm obtained by graft-copolymerizing a 0.1 mm thick polypropylene film with p-hydroxystyrene at a grafting ratio of 98% by weight in the same manner as described in Example 2. It was found that the concentration of sodium hydroxide in the catholyte was 16.0% by weight, that the concentration of sodium chloride was 0.02% by weight, and that the current efficiency was 76%.

EXAMPLE 6

Electrolysis was carried out in the same way as in Example 1 using a diaphragm obtained by sulfonating the graft-copolymer membrane obtained in Example 5. It was found that the concentration of sodium hydroxide in the catholyte was 16.2% by weight, that the concentration of sodium chloride was 0.02%, and that the current efficiency was 78%.

EXAMPLE 7

Electrolysis was carried out continuously for 1,000 hours using the same apparatus as used in Example 1 and a diaphragm which was obtained by graft copolymerizing a 0.2 mm thick polyethylene film with p-hydroxystyrene at a grafting ratio of 105% by weight using ionizing radiation from electron beams and which was subjected to a pre-treatment comprising immersing the diaphragm in a mixture of a 1N sodium hydroxide aqueous solution and dioxane (1:1 by volume) at a temperature of 80° C for a period of 2 hours. The current density was 15A/dm$^2$. In order to completely prevent $Cl_2$ from attacking the ion-exchange membrane, a neutral porous diaphragm (made of fluorine resin) was provided to separate the ion-exchange membrane in the anode compartment from the anode, and a suitable amount of water was added to the cathode compartment to maintain the concentration of sodium hydroxide in the catholyte at 11% by weight, and brine was supplied between the ion-exchange membrane and the neutral porous diaphragm. The total current efficiency of the continuous electrolysis for 1000 hours was 75%. The average concentration of sodium chloride in the catholyte was 0.002% by weight, and no reduction in current efficiency was observed even at the end of the electrolysis.

EXAMPLE 8

Electrolysis was carried out continuously for 1000 hours in the same way as in Example 7 and subjected to a pre-treatment in the same manner as described in Example 7 using a diaphragm obtained by sulfonating the graft copolymer membrane used in Example 7. When the concentration of sodium hydroxide in the catholyte was 8% by weight, the total current efficiency of the continuous electrolysis for 1000 hours was 85%, and the concentration of sodium chloride in the catholyte was less than 0.001% by weight. No reduction in current efficiency was observed even at the end of the electrolysis.

EXAMPLE 9

A polyethylene film having a thickness of 0.2 mm was cooled to −20° C, and electron beams of 20 Mrad were irradiated thereon under a nitrogen atmosphere. Subsequently, the resulting polyethylene film was inserted into a glass ampoule and a solution in which a monomer mixture of p-acetoxystyrene and divinylbenzene (divinylbenzene content of 55 wt%, an m- to p-weight ratio of about 2:1, hereinafter the same, and the remainder being mainly ethylvinyl benzene) at a mixing ratio of 9:1 by weight was dissolved in the same weight of benzene was added thereto, followed by thorough degassing in vacuum by repeating a freezing-melting procedure five times and heat-sealing. This glass ampoule was then heated to 60° C and the contents were reacted for one hour. After completion of the reaction, the seal of the glass ampoule was broken and the resulting film was then taken out, followed by washing thoroughly with acetone. The thus treated film was then hydrolyzed in the same manner as described in Example 1 to obtain a film having a grafting ratio of p-hydroxystyrene per se of 69 wt% and a total grafting ratio of 75 wt% (based on the polyethylene).

Electrolysis was then carried out in the same manner as described in Example 1 using the film thus obtained as a diaphragm. It was found that the concentration of sodium hydroxide in the catholyte was 17.2% by weight, that the concentration of sodium chloride was 0.02% by weight, and that the current efficiency was 87%.

EXAMPLE 10

Electrolysis was carried out in the same way as in Example 1 using a diaphragm obtained by sulfonating the same graft copolymer membrane as used in Example 9 in a 50% by weight dioxane solution of chlorosulfonic acid at 70° C for 5 hours. It was found that the concentration of sodium hydroxide in the catholyte was 17.3% by weight that the concentration of sodium chloride was 0.03% by weight, and that the current efficiency was 88%.

EXAMPLE 11

A 0.1 mm thick polypropylene film was irradiated in air with electron beams of a dose of 30 Mrads, and then subjected to grafting and hydrolysis in the same manner as described in Example 9 to obtain a film having a grafting ratio of p-hydroxystyrene per se of 91 wt% and a total grafting ratio of 115 wt% (based on the polypropylene).

Electrolysis was then carried out in the same manner as described in Example 1 using the polypropylene film thus obtained as a diaphragm. It was found that the concentration of sodium hydroxide in the catholyte was 17.0% by weight, that the concentration of sodium chloride was 0.02% by weight, and that the current efficiency was 85%.

EXAMPLE 12

On a polyethylene film having a thickness of 0.2 mm was grafted p-acetoxystyrene in the same manner as described in Example 5, and subsequently, divinylbenzene (in which a benzeneacetone mixed solution containing 3 wt% of divinylbenzene used as a monomer solution) was further grafted thereon in the same manner as described in Example 5. The thus treated film was then hydrolyzed to obtain a film having a grafting ratio of p-hydroxystyrene per se of 85 wt% and a total grafting ratio of 100 wt% (based on the polyethylene).

Electrolysis was then carried out in the same manner as described in Example 1 using the polyethylene film thus obtained as a diaphragm. It was found that the concentration of sodium hydroxide in the catholyte was 18.4% by weight, that the concentration of sodium chloride was 0.01% by weight, and that the current efficiency was 89.5%.

EXAMPLE 13

Electrolysis was carried out in the same way as in Example 1 except that a suitable amount of water was added to the cathode compartment to maintain the concentration of sodium hydroxide in the catholyte constant at 12% by weight, and the current density was adjusted to 15 A/dm$^2$.

When a membrane prepared by graft copolymerizing a 0.2 mm thick polyethylene film with p-hydroxystyrene and divinylbenzene having a grafting ratio of p-hydroxystyrene per se of 73 wt% and a total grafting ratio of 102 wt% (based on the polyethylene), using ionizing radiation from electron beams, was used as a diaphragm, the concentration of sodium chloride in the catholyte was 0.002% by weight, and the current efficiency was 92%.

When a membrane prepared by graft copolymerizing the same polyethylene film as used above with p-hydroxystyrene alone at a grafting ratio of 74% by weight was used as a diaphragm, the concentration of sodium chloride in the catholyte was 0.008% by weight, and the current efficiency was 77%.

EXAMPLE 14

Electrolysis was carried out in the same way as in Example 13 using a diaphragm prepared by sulfonating the same graft copolymer membrane as used in Example 13 having both p-hydroxystyrene and divinylbenzene grafted thereto, in a 50% by weight dioxane solution of chlorosulfonic acid at 70° C for 5 hours. It was found that the concentration of sodium chloride in the catholyte was 0.002% by weight, and the current efficiency was 92%.

EXAMPLE 15

Electrolysis was carried out in the same way as in Example 13 using a diaphragm prepared by graft copolymerizing a 0.1 mm thick polypropylene film with p-hydroxystyrene and divinylbenzene having a grafting ratio of p-hydroxystyrene per se of 97 wt% and a total grafting ratio of 125 wt% (based on the polypropylene) using ionizing radiation from electron beams. It was found that the concentration of sodium chloride in the catholyte was 0.002% by weight, and the current efficiency was 88%.

EXAMPLE 16

Electrolysis was carried out in the same way as in Example 13 using a diaphragm obtained by sulfonating the same graft copolymer membrane as used in Example 15 in a 50% by weight dioxane solution of chlorosulfonic acid at 70° C for 5 hours. It was found that the concentration of sodium chloride in the catholyte was 0.001% by weight, and the current efficiency was 90%.

EXAMPLE 17

A grafting reaction and a hydrolysis were carried out on a polystyrene film having a thickness of 0.1 mm in the same manner as described in Example 9 except that a mixed solution of methanol and benzene (2:1 by volume) was used. Thus, a film having a grafting ratio of p-hydroxystyrene per se of 80 wt% and a total grafting ratio of 85 wt% (based on the polyethylene) was obtained.

Electrolysis was then carried out in the same manner as described in Example 13 using the resulting polystyrene film as a diaphragm. It was found that the concentration of sodium chloride in the catholyte was 0.002% by weight, and the current efficiency was 85%.

EXAMPLE 18

A graft copolymerization was carried out on a polyethylene film having a thickness of 0.2 mm in the same manner as described in Example 9 (but the divinylbenzene content was 90% by weight, with the remainder being ethylvinyl benzene). Thus, a film having a grafting ratio of p-hydroxystyrene per se of 72 wt% and a total grafting ratio of 82 wt% (based on the polyethylene) was obtained.

Electrolysis was then carried out in the same manner as described in Example 13 using the resulting film as a diaphragm. It was found that the concentration of sodium chloride in the catholyte was 0.002% by weight and the current efficiency was 94%.

EXAMPLE 19

Electrolysis of a saturated potassium chloride solution was carried out in the same manner as described in Example 18 using the same apparatus and the same diaphragm as described in Example 18. The concentration of potassium hydroxide was 12% by weight, the concentration of potassium chloride was 0.02% by weight and the current efficiency was 98% by weight.

While the invention hs been described in detail and with reference to specific embodiments thereof, it will be apparent to one skilled in the art that various changes and modifications can be made therein without departing from the spirit and scope thereof.

What is claimed is:

1. A method for diaphragm electrolysis of an alkali metal halide which comprises electrolyzing an alkali metal halide solution by passing an electric current through an anode compartment and a cathode compartment of an electrolytic cell containing the alkali metal halide solution with an ion-exchange membrane of a graft copolymer of a polyolefin main chain and a side chain composed mainly of monohydroxystyrene and grafted to said polyolefin main chain separating the anode compartment and the cathode compartment.

2. The method of claim 1, wherein said graft copolymer is crosslinked.

3. The method of claim 2, wherein said graft copolymer is crosslinked with a difunctional compound reactive with phenolic hydroxyl groups.

4. The method of claim 3, wherein said difunctional compound is used in an amount of about 0.01 to 0.5 equivalent per equivalent of phenolic hydroxyl group.

5. The method of claim 3, wherein said difunctional compound is a diepoxide, a diisocyanate or an acid dihalide.

6. The method of claim 3, wherein said difunctional compound is ethylene glycol diglycidyl ether, diethylene glycol diglycidyl ether, bisphenol A diglycidyl ether, cyclohexane diol diglycidyl ether, an epoxy resin, hexamethylene diisocyanate, tolylene diisocyanate, xylylene diisocyanate, diphenylmethane-4,4'-diisocyanate, hexahydrotolylene diisocyanate, adipoyl dichloride, terephthaloyl dichloride or hexahydroterephthaloyl dichloride.

7. The method of claim 2, wherein said graft copolymer is crosslinked with a polyene compound containing at least two polymerizable double bonds in the molecule.

8. The method of claim 7, wherein the amount of said polyene compound is about 0.5 to 100% by weight based on the polyolefin main chain.

9. The method of claim 2, wherein said graft copolymer is crosslinked with an organic sulfonic acid compound.

10. The method of claim 9, wherein said compound is divinylbenzene.

11. The method of claim 9, wherein said compound is isoprene, butadiene, cyclopentadiene, ethylidene norbornene, a diol ester of acrylic acid or methacrylic acid, or a divinylester of adipic acid.

12. The method of claim 1, including pre-treating said ion-exchange membrane with a solution of an alkali metal hydroxide prior to the electrolysis.

13. The method of claim 12, wherein said pre-treating comprises contacting said ion-exchange membrane with an aqueous solution of an alkali metal hydroxide; an aqueous solution of an alkali metal hydroxide additionally containing an organic solvent capable of being uniformly mixed with said aqueous solution and capable of swelling said ion-exchange membrane; or a solution of an alkali metal hydroxide in a lower aliphatic alcohol.

14. The method of claim 13, wherein the concentration of said alkali metal hydroxide in said alkali metal hydroxide solution is about 0.1 to 12N and the contacting of said ion-exchange membrane with said alkali metal hydroxide solution is conducted at a temperature of about room temperature to about 90° C for a period of about 30 minutes to about 5 hours.

15. The method of claim 1, wherein said polyolefin is an aliphatic polymer, an aromatic polymer or an alicyclic polymer.

16. The method of claim 15, wherein said polyolefin is polyethylene.

17. The method of claim 15, wherein said polyolefin is polypropylene.

18. The method of claim 15, wherein said polyolefin is polystyrene.

19. The method of claim 1, wherein said side chain comprises monohydroxystyrene and a polyene compound containing at least two polymerizable double bonds.

20. The method of claim 19, wherein the weight ratio of the hydroxystyrene to the polyene compound is about 200:1 to 1:1.

21. The method of claim 1, wherein said graft copolymer is sulfonated.

22. The method of claim 21, wherein said graft copolymer contains about 0.5 to 2 sulfonic acid groups introduced per monohydroxystyrene unit.

23. The method of claim 1, wherein the monohydroxystyrene content is about 5 to 500% by weight based on the polyolefin main chain.

* * * * *